United States Patent [19]
He

[11] Patent Number: 5,987,016
[45] Date of Patent: Nov. 16, 1999

[54] METHOD AND APPARATUS FOR TRACKING A COMMUNICATION SIGNAL IN A WIRELESS COMMUNICATION SYSTEM

[75] Inventor: Rong He, Palatine, Ill.

[73] Assignee: Motorola, Inc., Schaumburg, Ill.

[21] Appl. No.: 08/964,124

[22] Filed: Nov. 4, 1997

[51] Int. Cl.⁶ .................................................. H04B 15/00
[52] U.S. Cl. ...................... 370/335; 370/320; 370/342; 375/200
[58] Field of Search ..................................... 370/209, 320, 370/335, 342, 441; 375/200, 206, 347, 349, 367, 376

[56] References Cited

U.S. PATENT DOCUMENTS

| | | | |
|---|---|---|---|
| 5,477,195 | 12/1995 | Spilker | 375/208 |
| 5,490,165 | 2/1996 | Blakeney, II et al. | 375/265 |
| 5,574,721 | 11/1996 | Magill | 375/206 |
| 5,608,722 | 3/1997 | Miller | 375/206 |
| 5,621,752 | 4/1997 | Antonio et al. | 375/200 |
| 5,691,974 | 11/1997 | Zehavi et al. | 370/203 |
| 5,809,064 | 9/1998 | Fenton et al. | 375/208 |

*Primary Examiner*—Chi H. Pham
*Assistant Examiner*—Frank Duong
*Attorney, Agent, or Firm*—Kenneth A. Haas

[57] ABSTRACT

The method for tracking a mobile communication signal, which operates in a code division multiple access wireless communication system including an antenna (401), and a base site receiver (400) having at least two receiver tracking fingers (F1, F2), includes receiving at the antenna (401) a first multipath signal (119) arriving at an on-time pn-offset (706) with an associated advanced pn-offset value (704) and retard pn-offset value (702) and receiving at the antenna (401) a second multipath signal (107) arriving at an on-time pn-offset (712) with an associated advanced pn-offset value (710) and retard pn-offset value (708). The method further includes determining a spacing between the first multipath signal and the second multipath signal, and adjusting the at least two receiver tracking fingers based on the advanced pn-offset value of one of the multipath signals and the retard pn-offset value of the other multipath signal.

8 Claims, 5 Drawing Sheets

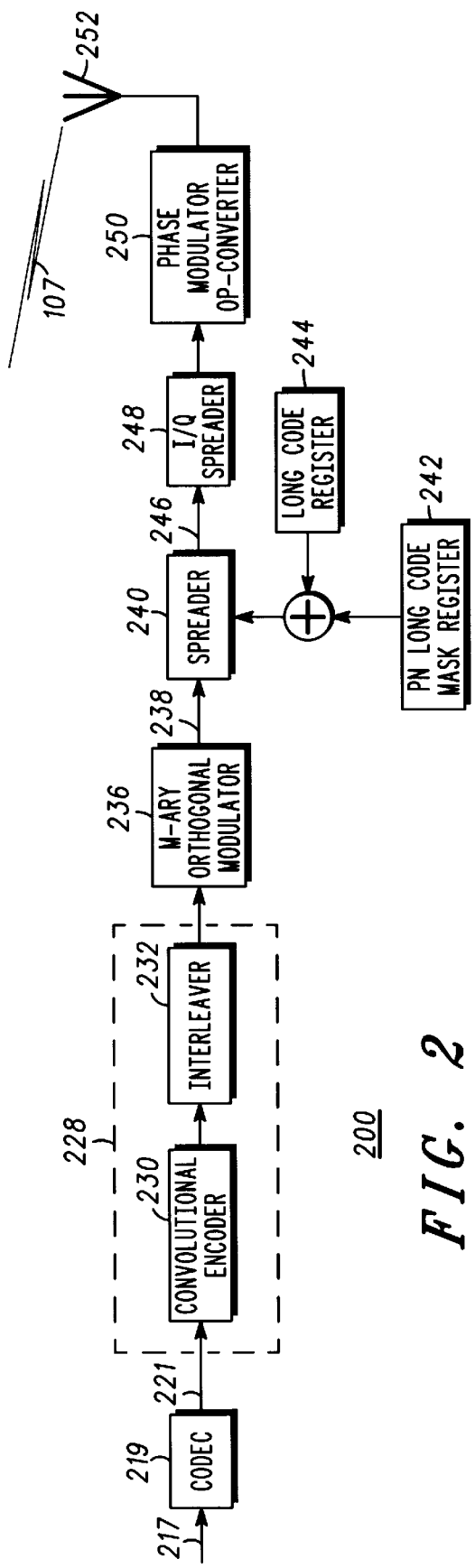
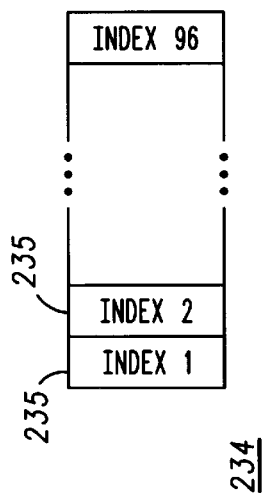
FIG. 2
FIG. 3

METHOD AND APPARATUS FOR TRACKING A COMMUNICATION SIGNAL IN A WIRELESS COMMUNICATION SYSTEM

FIELD OF THE INVENTION

The present invention relates generally to wireless communication systems and, more particularly, to a method and apparatus for tracking a mobile communication signal within a wireless communication system.

BACKGROUND OF THE INVENTION

Communication systems that utilize coded communication signals are known in the art. One such system is a direct sequence code division multiple access (DS-CDMA) cellular communication system, such as set forth in the Telecommunications Industry Association Interim Standard 95A (TIA/EIA IS95A) herein after referred to as IS-95A. In accordance with IS-95A, the coded communication signals used in the DS-CDMA system comprise signals that are transmitted in a common 1.25 MHz bandwidth to base sites of the system from communication units, such as mobile or portable radiotelephones, that are communicating in the coverage areas of the base sites. Each DS-CDMA signal includes, inter alia, a pseudorandom noise (PN) binary code associated with a particular base site and a PN sequence associated with a particular mobile station.

During a typical communication, a mobile station travels within a coverage area of a base site that is supporting the mobile station communication. Such movement typically results in fading of the mobile communication signal transmitted to the base site due to multipath propagation of the transmitted signal. As is known, multipath propagation results from the reflections of the transmitted signal off of nearby scatterers, such as buildings. These reflections produce replicas of the originally transmitted signal which arrive at the base site at various times depending on the effective propagation distances traveled by the replicas. The originally transmitted signal and its reflected replicas are typically referred to as multipath signals of the originally transmitted signal.

To demodulate the transmissions from a particular mobile station, a base site receiver must first differentiate the multipath signals associated with a particular mobile station from other multipath signals as well as simple noise associated with other mobile stations. This identification of a particular mobile station's multipath signals, including their locations with reference to an offset in time (referred to as a pn-offset), may be referred to as an antenna, or signal search, which takes advantage of well known principles of time-diversity demodulation. In a CDMA system, the pn-offset is measured in increments of time referred to as pseudorandom noise (PN) chips, wherein each PN chip is approximately equivalent to 80 milliseconds.

In a sectorized antenna system, there are generally two antennas for each of the sectors. For a typical time-diversity demodulation process, the initial searching process begins in a searcher. The searcher identifies the strongest received multipath signals via correlating PN sequences with the incoming multipath signal over a range of pn-offsets. The searcher then calculates the received multipath signal energies over the range of pn-offsets, incremented in ½ PN chip steps, for a set of antennas but does not demodulate or decode the information at these offsets.

The search is set such that the antennas within a sector are searched serially. After all the antennae have been searched, the searcher outputs two arrays of eight data points, referred to as winning Walsh energies at their associated pn-offsets. The resulting pn-offsets are then compared, using a finger assignment algorithm, to the previously selected pn-offsets for the four RAKE receiver demodulator fingers. The previously selected pn-offsets may or may not be replaced by one or more of the resulting sixteen pn-offsets, depending on the finger assignment algorithm. Accordingly, the four RAKE receiver demodulator fingers track and demodulate the multipath signals at their associated pn-offsets.

A delay lock loop (DLL) algorithm in each RAKE receiver demodulator finger serves to further correlate the multipath signal energies using pn-offset increments of ⅛ PN chips thus yielding ⅛ PN chip resolution.

In urban areas, two or more multipath signals arriving at the same antenna may have pn-offsets which are within 1 PN chip apart. When this occurs, the advantage of time-diversity demodulation is diminished because of the increased correlation between the two multipath signals and the ½ PN chip resolution limitation of the searcher. For example, field testing has indicated that at 900 megahertz (MHz), base site RAKE receiver performance measured as full-rate frame erasure rate (FER), was substantially degraded when two multipath signals arrived at one antenna with pn-offsets which were equal to, or less than one Walsh chip apart.

Therefore, a need exists for a method and apparatus for tracking a communication signal in a wireless communication system which improves the prior art tracking algorithm.

BRIEF DESCRIPTION OF THE DRAWINGS

FIG. 2 is a block diagram of a mobile unit transmitter for generating a communication signal.

FIG. 3 is a diagram of a digitally encoded and interleaved frame created by the transmitter in FIG. 2.

DETAILED DESCRIPTION OF THE PREFERRED EMBODIMENT

Figure 1:
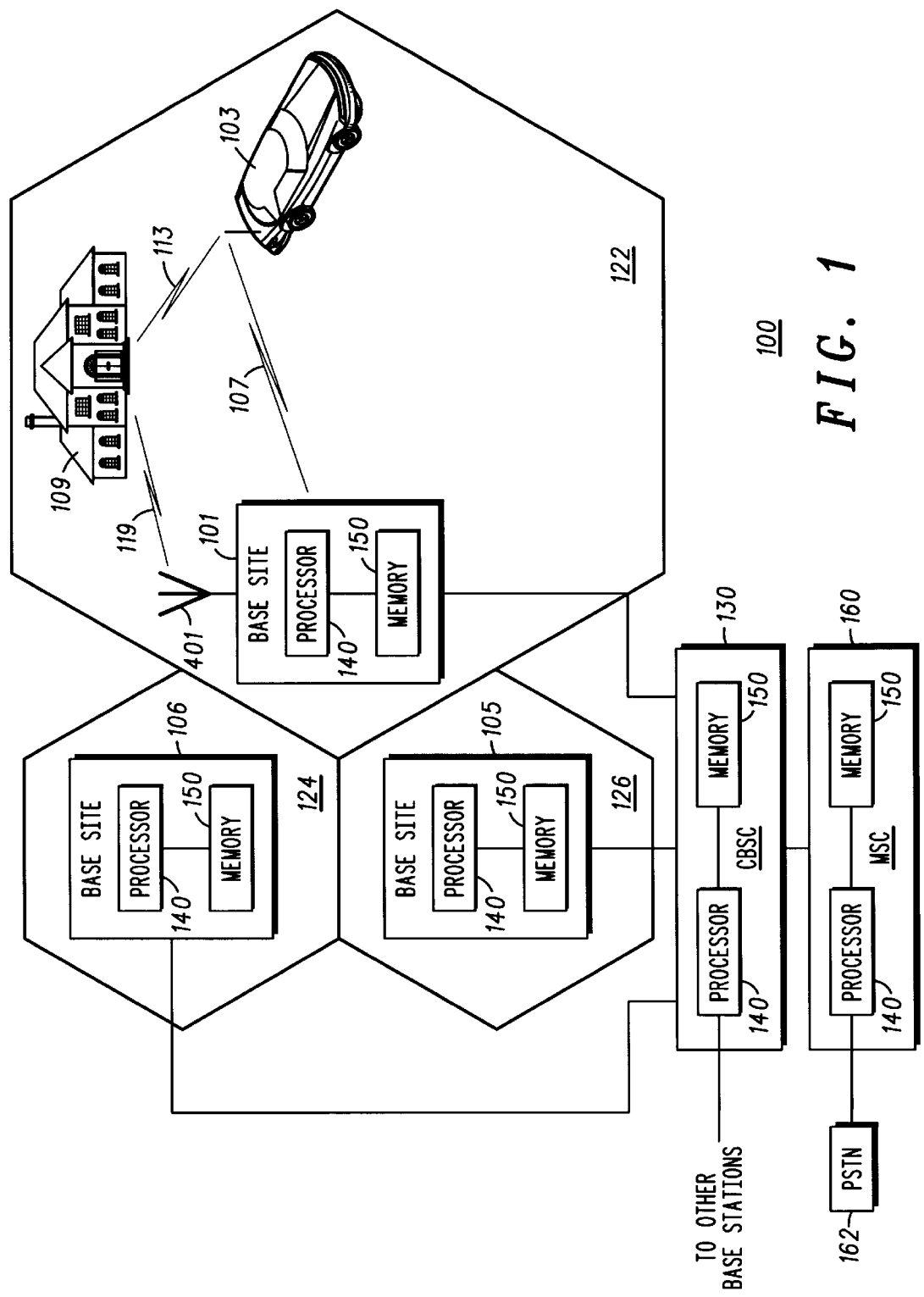
FIG. 1 depicts a typical wireless communication system.

An improvement for tracking a mobile communication signal which operates in a code division multiple access wireless communication system is presented. This approach employs a controller in communication with a base site RAKE receiver. The controller, based on characteristics and comparisons of received multipath signals pn-offset values, adjusts tracking operation in the base site RAKE receiver.

Stated specifically, a method for tracking a mobile communication signal, which operates in a code division multiple access wireless communication system is described herein. The wireless communication system includes an antenna, and a base site receiver having at least two receiver tracking fingers. The method includes receiving at the antenna a first multipath signal arriving at an on-time pn-offset and a second multipath signal arriving at an on-time pn-offset. The on-time pn-offset value of the first multipath signal has an associated advanced pn-offset value and retard pn-offset value, which is subsequently calculated by a first delay lock loop in one of the two receiver tracking fingers. Similarly, the on-time pn-offset value of the second multipath signal has an associated advanced pn-offset value and retard pn-offset value which is subsequently calculated by a second delay lock loop in the other receiver tracking finger. A controller in communication with the base site receiver, receives and stores the advanced pn-offset value and the retard pn-offset value calculated by the first delay lock loop, and the advanced pn-offset value and the retard pn-offset value calculated by the second delay lock loop. In addition, the controller receives the on-time pn-offset values from a finger manager and using the on-time pn offset values of the first and second multipath signals, determines a spacing between on-time pn offset values of the first and second multipath signals. Based on the spacing, the controller adjusts the tracking of the at least two RAKE receiver fingers. The tracking is adjusted using the advanced pn-offset value from one multipath signal and the retard pn-offset of the other multipath signal. A corresponding apparatus generally implements the above recited method.

In the preferred embodiment, the controller determines the spacing by establishing a time difference between the on-time pn-offset associated with the first multipath signal and the on-time pn-offset associated with the second multipath signal, forming an established time difference. Adjustment of RAKE receiver tracking is then enabled based upon a comparison of the established time difference and a predetermined time difference threshold. If the established time difference is less than the predetermined time difference threshold of ⅝ PN chip, the controller retrieves a previous retard pn-offset value associated with the first multipath signal and a previous advanced pn-offset value associated with the second multipath signal. Next, the controller substitutes the previous retard pn-offset value associated with the first multipath signal and the previous advanced pn-offset value associated with the second multipath signal in an operation of the first and second delay lock loop, subsequently forming a new adjusted on-time pn-offset location. The new adjusted on-time pn-offset location is used to track the mobile communication signal via inputting the new adjusted on-time pn-offset location to a despreader which is in communication with its corresponding delay lock loop.

The pn-offsets are measured in PN chips. The advanced pn-offset value is ½ PN chip above the on-time pn-offset value while the retard pn-offset value is ½ PN chip below the PN-offset.

Turning now to the drawings, wherein like numerals designate like components, FIG. 1 illustrates a typical communication system 100. Communication system 100 preferably comprises a direct sequence code division multiple access (DS-CDMA) cellular communication system, such as that set forth in the Telecommunications Industry Association Interim Standard 95A (TIA IS-95A).

Communication system 100 includes base sites 101, 106, 105 and one or more mobile stations although only one mobile station 103 is shown. Base site 101 includes, among other things, a processor 140 and a memory 150. Base site 101 includes a RAKE receiver that receives coded communication signals from mobile station 103 within a coverage area 122 of base site 101. The RAKE receiver provides independent tracking capability of incoming coded communication signals via four branches, or fingers. Mobile station 103 includes a transmitter (discussed further below) that transmits coded communication signals to base site 101.

Base site 101 is coupled to a base station controller 130, which includes, among other things, a processor 140 and a memory 150, and which is in turn coupled to a mobile switching center 160, also including a processor 140 and a memory 150. Mobile switching center 160 is coupled to the public switched telephone network (PSTN) 162 using known techniques.

Signals 107 and 119 are conveyed between mobile station 103 and base site 101 through a radio frequency (RF) channel. The RF channel includes a reverse link (mobile station 103 to base site 101) and a forward link (base site 101 to mobile station 103). Communication signals 107 and 119 include an initial state pseudo-random long code (not shown) associated with and assigned by base site 101, and a mobile unique pseudo-random long code mask (not shown). This results in a mobile unique pseudo-random noise sequence (PN sequence) for mobile station 103, which is identifiable by the RAKE receiver at base site 101.

Signals 119 and 113 are multipath replicas of mobile transmitted signal 107, due, for example, to reflections of transmitted signal 107 off of scatterers such as building 109. Multipath replica 119 and signal 107 arrive at base site 101 at a different pn-offsets. The different pn-offsets result are the result of varying propagation distances.

FIG. 2 is a block diagram of a transmitter 200, for use in a mobile unit such as mobile unit 103, for generating communication signal 107. A data bit stream 217, which may be voice, video or another type of information, enters a variable-rate coder 219, which produces a signal 221 comprised of a series of transmit channel frames having varying transmit data rates. The data rate of each frame depends on the characteristics of data bit stream 217.

Encoder block 228 includes a convolutional encoder 230 and an interleaver 232. At convolutional encoder 230, the transmit channel frame may be encoded by a rate ⅓ encoder using well known algorithms such as convolutional encoding algorithms which facilitate subsequent decoding of the frames. Interleaver 232 operates to shuffle the contents of the frames using commonly known techniques such as block interleaving techniques.

FIG. 3 is a diagram of a digitally encoded and interleaved frame created by the transmitter in FIG. 2. As shown, each frame 234 of digitally coded and interleaved bits includes ninety-six groups of six coded bits, for a total of 576 bits. Each group of six coded bits represents an index 235 to one of sixty-four symbols such as Walsh code symbols. A Walsh code symbol corresponds to a single row or column of a sixty-four-by-sixty-four Hadamard matrix, a square matrix of bits with a dimension that is a power of two. Typically, the bits comprising a Walsh code symbol are referred to as Walsh chips.

Referring again to FIG. 2, each of the ninety-six Walsh code indices 235 in frame 234 are input to an M-ary orthogonal modulator 236, which is preferably a sixty-four-ary orthogonal modulator. For each input Walsh code index 235, M-ary orthogonal modulator 236 generates, at output 238, a corresponding sixty-four-chip Walsh symbol W 239. Thus, a series of ninety-six, sixty-four-chip Walsh symbols W 239 are generated for each frame 234 input to M-ary orthogonal modulator 236 and are based on the input bit stream.

Spreader block 240, among other things, applies a pseudorandom noise (PN) sequence to the series of Walsh codes W 239 using well-known scrambling techniques. Typically, in DS-CDMA, spreader block 240 spreads the series of Walsh symbols using a mobile unique PN sequence. The mobile unique PN sequence is the result of the sum of the mobile unique pseudo-random long code mask generated by a PN long code mask register 242, and an initial state pseudo-random long code generated by long code register 244, the initial state pseudo-random long code determined by a Global Position Satellite (GPS) system (not shown) and initiated by the base site. Upon receipt of mobile transmitted signal 107, the base site uses the mobile unique PN sequence as a mobile station identifier.

At block 248, the scrambled series of sixty-four-chip Walsh symbols 246 is a phase modulated using an offset quaternary phase-shift keying (OQPSK) modulation process or another modulation process. The resulting signal is then up-converted 250 and transmitted as communication signal S(T) 107 from antenna 252.

Figure 4:
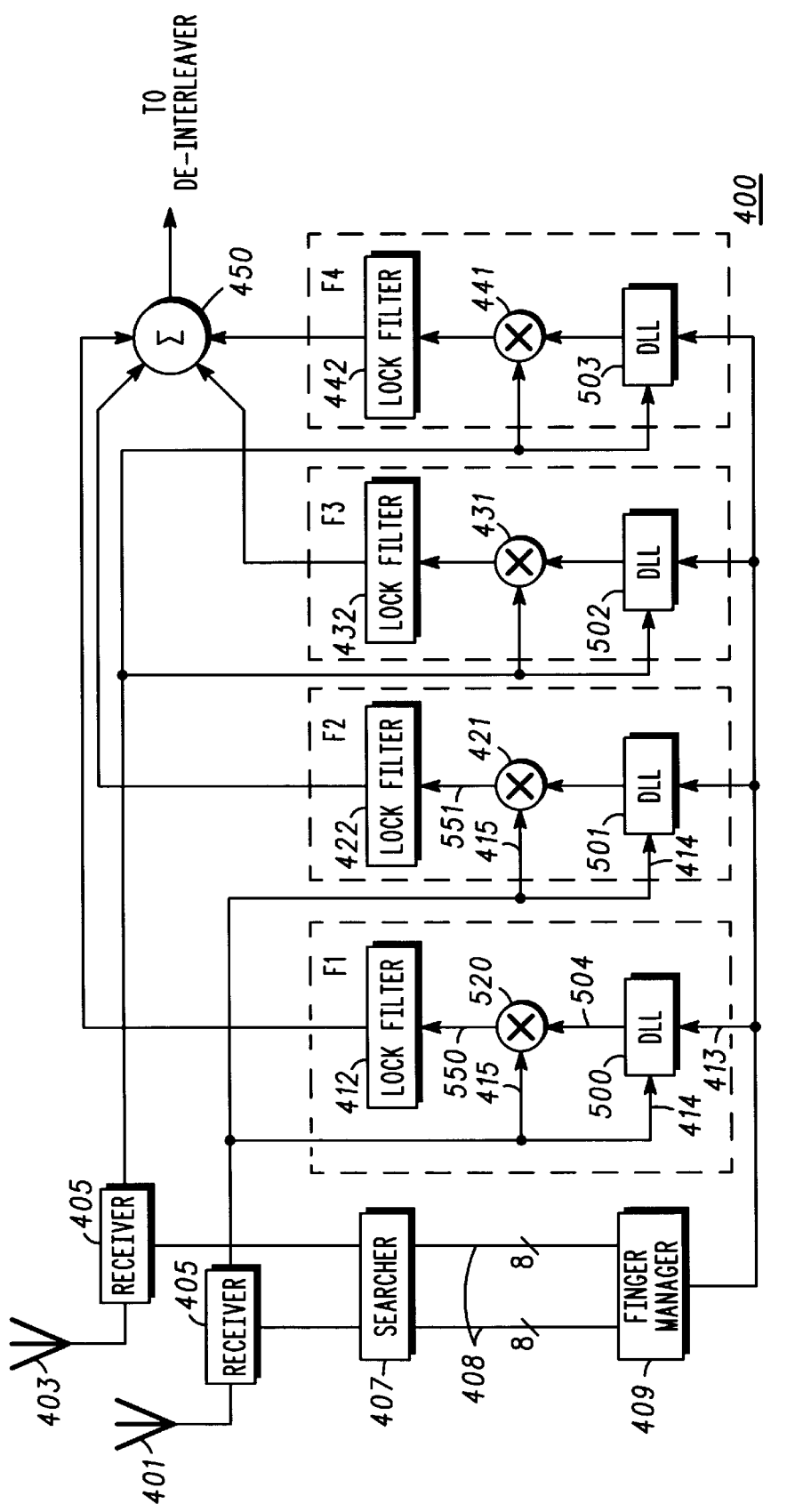
FIG. 4 is a partial block diagram of an apparatus for receiving the communication signal generated by the transmitter depicted in FIG. 2.

FIG. 4 is a partial block diagram of an apparatus for receiving the communication signal generated by the transmitter depicted in FIG. 2. RAKE receiver 400 receives a mobile communication signals as well as their multipath replicas. RAKE receiver 400 may be within base station 101 (shown in FIG. 1). For purposes of discussion, two antennas 401 and 403, representing one sector, are shown. Antennae 401 and 403 receive multipath signals 107 and 119. Front-end processing such as filtering and frequency down-converting of multipath signals 107 and 119 is performed by well known methods and circuits at filter block 405.

A searcher 407, using autocorrelation techniques well known in the art, seeks to differentiate and eliminate noise, resulting from other mobile units' transmissions, in order to yield an incoming bit stream associated with particular a mobile station, such as mobile station 103. Searcher 407, the operation and construction of searchers being generally well known, attempts to lock onto received signals 107 and 119 at a plurality of time offsets. The time offsets at which multipath signals 107 and 119 are captured are referred to as their on-time pn-offsets. Searcher 407 may be implemented using an application specific integrated circuit (ASIC) or using other suitable means.

Upon receiving multipath signals 107 and 119, searcher 407 calculates stores the winning Walsh energies and pn-offsets associated with received multipath signals 107 and 119. Consequent to storing the information, searcher 407 searches the stored information in ½ PN chip increments, in order to differentiate multipath signals from each other by their associated on-time pn-offsets and their correlation energies. Outputs 408 from searcher 407 are input to a finger manager 409 which then uses a finger assignment algorithm to determine the on-time pn-offset assignments for each of four RAKE receiver fingers.

For example, searcher outputs 408 may include, two of an array of eight correlation energies at their associated pn-offsets, as determined by a preselected energy output threshold in searcher 407. A finger assignment algorithm in finger manager 409, uses outputs 408 to assign the RAKE receiver fingers to demodulation locations. The RAKE receiver fingers are assigned to an on-time pn-offset via finger manager output 413.

Each of the four RAKE receiver fingers, annotated as F1, F2, F3, and F4, include a delay lock loop for tracking, a despreader for despreading, and a lock filter. Accordingly, the delay lock loop (DLL) in each RAKE receiver tracking fingers F1, F2, F3 and F4 are assigned to a particular on-time pn-offset where it is highly likely that a multipath signal associated with mobile station 103, may be demodulated.

Although four RAKE receiver tracking fingers are shown, only RAKE receiver tracking fingers, F1 and F2 are described in detail. RAKE receiver tracking finger F1 includes a DLL 500, a despreader 520, and a lock filter 412. DLL 500 acts as a multipath signal tracking circuit and includes an input from finger manager output 413, an input 414 from filter block 405, and an output 504. The input from finger manager 409 is a despreading location, expressed as an on-time pn-offset location of a multipath signal such as multipath signal 119. Input 414 represents a multipath signal which has been filtered and down-converted at block 405. An adjusted on-time pn-offset (discussed below) is input to despreader 520 via DLL output 504. Despreader 520 also includes an input 415 and an output 550 to lock filter 412.

Output 504, resulting from a PN sequence generator in DLL 500, directs despreader 520 via a pn-offset value which reflects an adjustment to the on-time pn-offset originally presented from finger manager 409. Based on characteristics of output 504, despreader 520 despreads multipath signal 119 such that either multipath signal 119 is demodulated at its on-time pn-offset (0), is demodulated its on-time pn-offset plus ⅛ PN chip (+⅛), or is demodulated at its on-time pn-offset minus ⅛ PN chip (−⅛). Despreader 520 removes the mobile unique PN sequence from multipath signal 119. A resulting despread multipath signal 550 is directed to lock filter 412 which determines whether a particular finger output (demodulated signal) should be combined with other finger outputs, and further demodulated.

Similarly, RAKE receiver tracking finger F2 includes a delay lock loop (DLL) 501, a despreader 421, and a lock filter 422. DLL 501 acts as a multipath signal tracking circuit and includes an input from finger manager output 413, an input 414 from filter block 405, and an output 506. The input from finger manager output 413 is a despreading location, expressed as an on-time pn-offset location of a multipath signal such as multipath signal 119. Input 414 represents a multipath signal which has been filtered and down-converted at block 405. An adjusted on-time pn-offset (discussed below) is input to despreader 421 via DLL output 506. Despreader 421 also includes an input 415 and an output 551 to lock filter 422.

Output 506, resulting from a PN sequence generator in DLL 501, directs despreader 421 via a pn-offset value which reflects an adjustment to the on-time pn-offset originally presented from finger manager 409. Based on characteristics of output 506, despreader 421 despreads multipath signal 119 such that either multipath signal 119 is demodulated at its on-time pn-offset (0), is demodulated its on-time pn-offset plus ⅛ PN chip (+⅛), or is demodulated at its on-time pn-offset minus ⅛ PN chip (−⅛). Despreader 421 removes the mobile unique PN sequence from multipath signal 119. A resulting despread multipath signal 551 is directed to lock filter 422 which determines whether a particular finger output (demodulated signal) should be combined with other finger outputs, and further demodulated.

Figure 5:
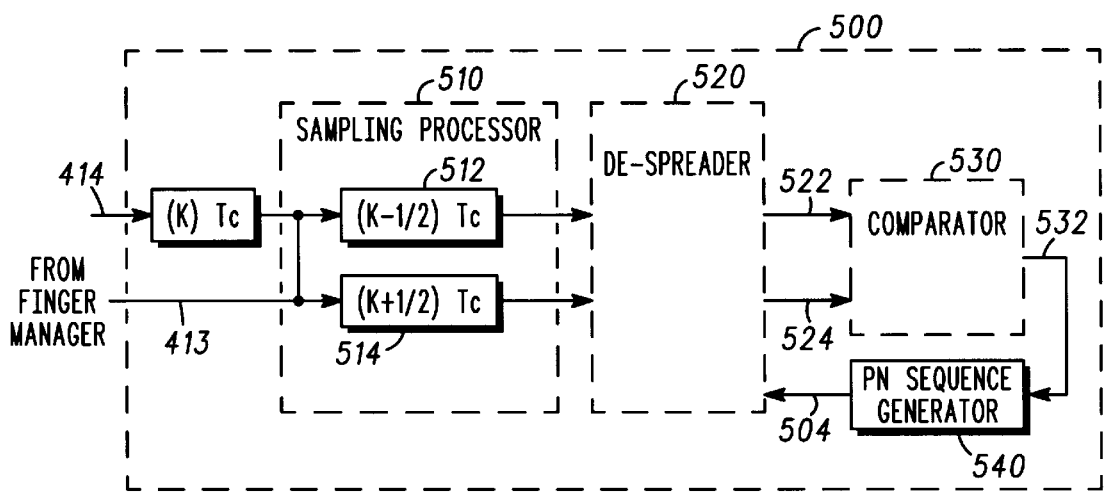
FIG. 5 is a partial block diagram of a delay lock loop depicted in FIG. 4.

FIG. 5 is a partial block diagram of the delay lock loop 500 depicted in FIG. 4. DLL 500, using well known sampling, comparison and feedback techniques, incrementally reassigns its associated RAKE receiver finger from the on-time pn-offset location identified by searcher 407, to an adjusted on-time pn-offset location calculated by DLL 500. The adjusted on-time pn-offset value is calculated using a comparison of energy values generated from received multipath signals such as multipath signal 119 and 107.

The adjusted on-time pn-offset is generated in DLL 500 as follows. Multipath signal 119, determined to be demodulatable, is directed to depreader 520 via input 414, where it is despread at its on-time pn-offset. Concurrently, multipath signal 119 is also directed to input 414 while its on-time pn-offset value is input to DLL 500. Next, multipath signal 119 is sampled by a sampling processor 510 which then generates an advanced multipath ray 512, located ½ PN chip higher than the on-time pn-offset value, and a retard multipath ray 514, located ½ PN chip lower than the on-time pn-offset value. In FIG. 5, advanced multipath ray 512 is annotated as (K−½) Tc, while retard multipath ray 514 is annotated as (K+½) Tc.

Advanced multipath ray 512 and retard multipath ray 514 are input to despreader 520 which removes the mobile unique PN sequence which was applied at spreader block 240 shown in FIG. 3. Despreader 520 yields a despread advanced multipath ray 522 and a despread retard multipath ray 524 which are input to a comparator 530. Comparator 530 computes the energy associated with despread advanced multipath ray 522 and the energy associated with despread retard multipath ray 524. Comparator 530 then compares the two energies, and, as a result of a comparator output 532, directs a PN sequence generator 540 to increment, decrement, or no-change the value of the on-time pn-offset. The resulting adjusted on-time pn-offset value which appears at output 504 is input to despreader 520. DLL 500 may be implemented using an application specific integrated circuit (ASIC) or using other suitable means.

RAKE receiver fingers F1, F2, F3 and F4, are assigned, independently from each other, to a particular on-time pn-offset. As such, each RAKE receiver fingers has no knowledge of the on-time pn-offset locations assigned to other fingers. Consequently, in urban areas, two multipath signals being received at the same antenna, which are correctly being demodulated on two RAKE receiver tracking fingers may be erroneously combined such that one combined multipath signal is incorrectly demodulated on the two RAKE receiver fingers. This typically happens when the on-time pn-offset values of the two multipath signals approach each other, i.e. less than ⅝ PN chip apart, and the ½ PN chip resolution limitation of the searcher results in the combined multipath signal. As a result, DLL operation in the two RAKE receiver tracking fingers may be corrupted when its sampling processor generates an advanced and retarded multipath ray based upon an erroneous, on-time pn-offset. Lack multipath signal differentiation by the DLLs ultimately results in performance degradation of RAKE receiver finger demodulation.

For example, multipath signals 107 and 119 arrive at antenna 401. Searcher 407 determines that multipath signal 119 has an on-time pn-offset value of 12 PN chip, and multipath signal 107 has an on-time pn-offset of 14 PN chip. Finger manager 409 assigns DLL 500 to track multipath signal 119, and DLL 501 to track multipath signal 107. As mobile station 103 moves through the area covered by RAKE receiver 400, the on-time pn-offsets of multipath signal 119 and 107 shift until they are within ⅝ PN chip apart or less, for example 12 PN chip and 13 PN chip. Based on results from searcher 407, finger manager 409 assigns DLL 500 and 501 to track a "false" or combined multipath signal. The combined multipath signal represents the combined energy and on-time pn-offsets associated with multipath signals 107 and 119. Consequently, the advantage of time-diversity tracking inherent in RAKE receivers is lost.

Figure 6:
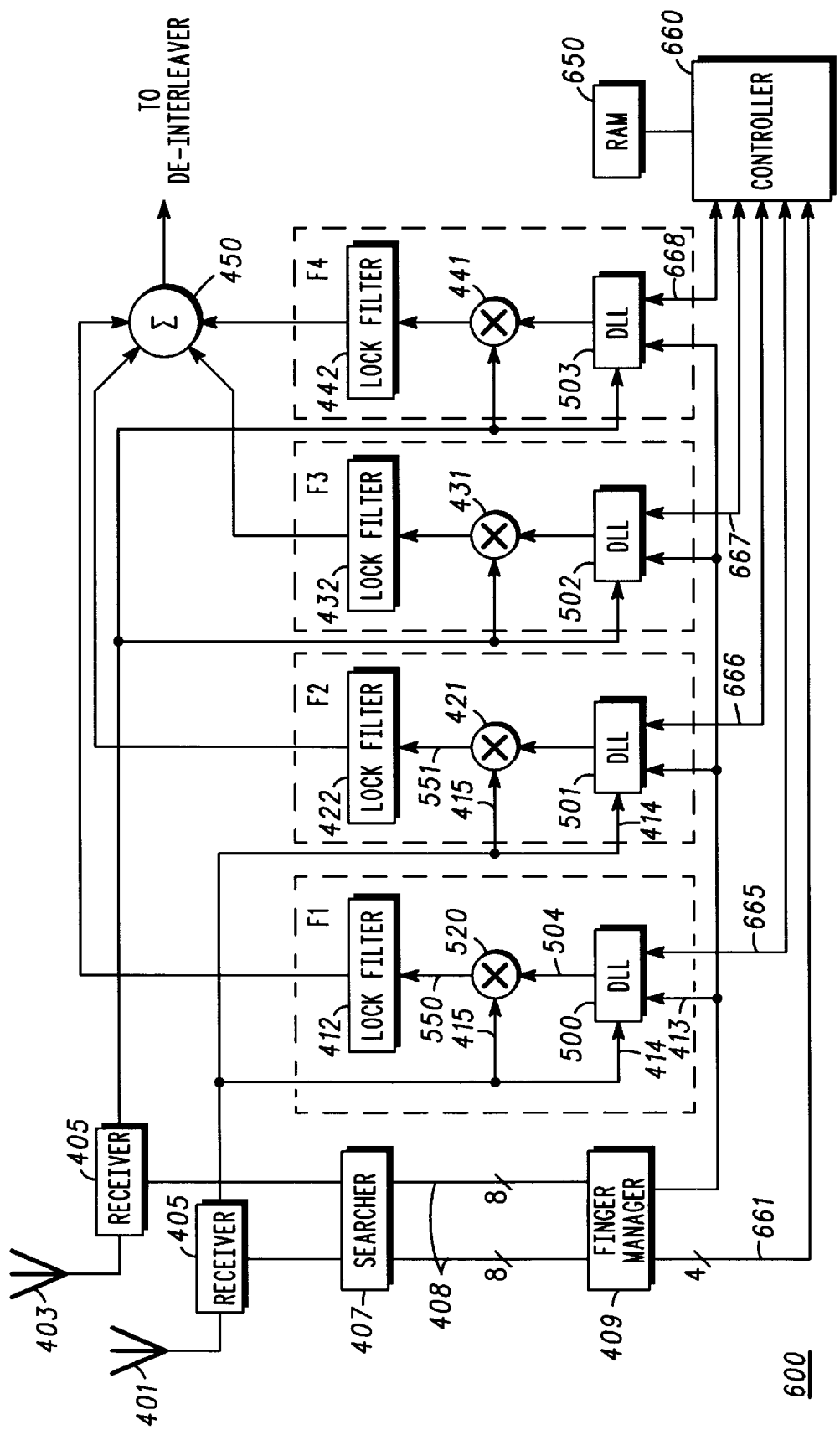
FIG. 6 is a partial block diagram of an apparatus for receiving the mobile communication signal according to a preferred embodiment of the present invention.

FIG. 6 is a partial block diagram of an apparatus for receiving the mobile communication signal according to a preferred embodiment of the present invention. As shown, RAKE receiver 400 is configured with a controller 660 to overcome the problem of erroneously tracking a combined multipath signal. and may be generally designated as base site receiver 600,. Controller 660 is configured to receive outputs 661 from finger manager 409. Outputs 661 represent the four on-time pn-offset values selected by finger manager 409. Controller 660 also communicates via links 665–668 to DLLs 500–503 in order to monitor adjusted on-time pn-offsets resulting from DLL calculations, as well as to direct DLL operation. Controller 660 may be implement in either software or hardware, or may be included as a function in an ASIC.

In addition to monitoring DLLs 500–503 operation for their adjusted on-time pn-offset values, controller 660 monitors and stores the generated advanced and retard pn-offset values.

Upon receipt of the on-time pn-offset values selected by the finger manager algorithm, a comparison of the on-time pn-offset values is made by controller 660. If the results of the controller comparison reveal that all of the on-time pn-offset values received at the same antenna are greater than ⅝ PN chip apart, controller 660 stores the on-time pn-offset values as well as their associated advanced and retard pn-offset values. If the results of the controller comparison reveal that two or more of the on-time pn-offset values received at the same antenna are less than ⅝ PN chip apart, controller 660 identifies the DLLs which were previously tracking the multipath signals associated with the two or more on-time pn-offset values and notes their previous advanced and retard pn-offset values. Once identified, DLL operation is overridden by controller 660 according to a preferred embodiment of the present invention.

For example, multipath signal 119, determined to have an on-time pn-offset value of 12, is assigned to DLL 500. Similarly multipath signal 107, determined to have an on-time pn-offset value of 14 is assigned to DLL 501. As the on-time pn-offset values of multipath signals 119 and 107 shift, DLL 500 and 501 continue to generate new advanced and retard pn-offset values which are stored in random access memory (RAM) 650 by controller 660.

Figure 7:
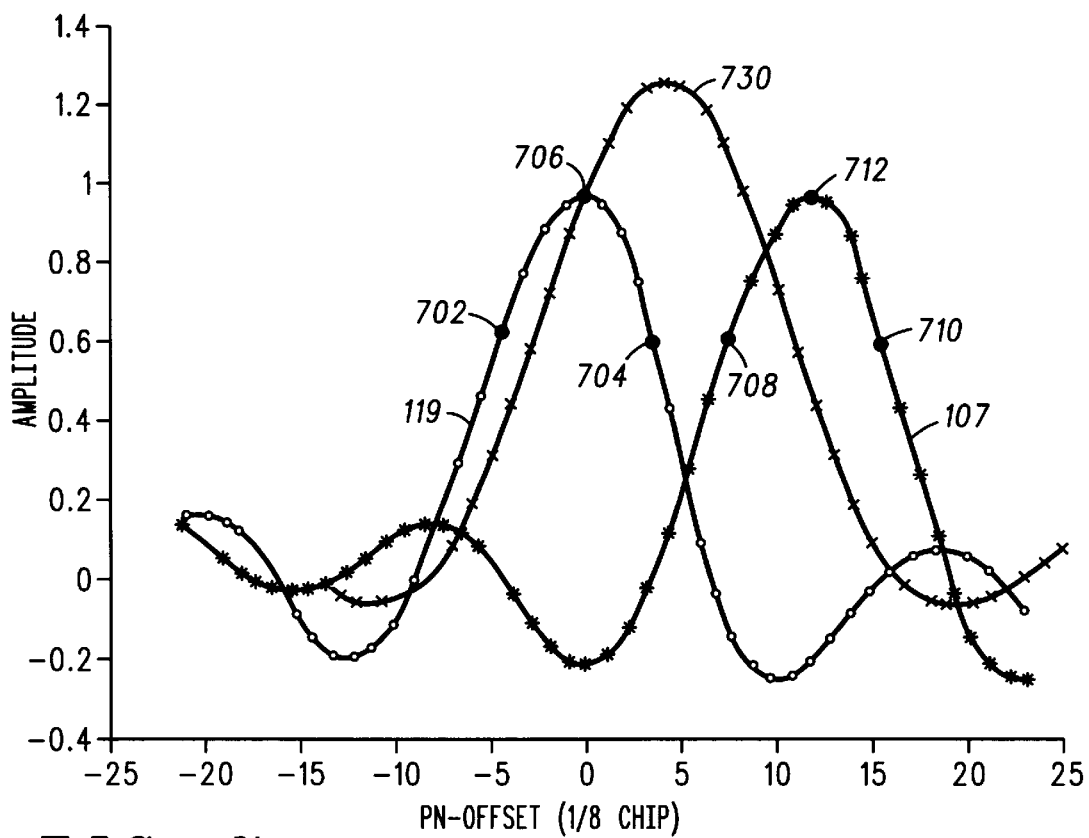
FIG. 7 is a graphical illustration of a two multipath signals at their associated pn-offsets.

FIG. 7 illustrates an example of multipath signals 119 and 107 which have correspondingly shifted to on-time pn-offset values 706, and 712 of 12 and 13 ½. As a result, DLL 500 generated a retard pn-offset value 702 of 11 ½ PN chip and an advanced pn-offset value 704 of 12 ½ PN chip corresponding to an on-time pn-offset value 706 of 12 PN chip. Similarly, DLL 501 generated a retard pn-offset value 708 of 13 PN chip and an advanced pn-offset value 710 of 14 PN chip corresponding to an on-time pn-offset value 712 of 13 ½ PN chip. As a result, DLL 500 and 501 conventional tracking of multipath signals 119 and 107 proceeded nominally.

As multipath signals 119 and 107 continue to shift, a comparison of on-time pn-offset values reveal that the on-time pn-offset values of multipath signal 119 and 107 have shifted to within ⅝ PN chip apart or less, for example 12 PN chip and 13 PN chip. Using previous tracking methods, based on results from searcher 407, finger manager 409 assigns DLL 500 and 501 to track a "false" or a combined multipath signal 730. In addition, the characteristic independent tracking capability of DLL 500 and DLL 501 eventually allow the two on-time pn-offsets to be combined. Using the methods of the present invention discussed herein, controller 660, upon noting the shift, prevents the two on-time pn-offsets from being combined as follows. Controller 660 retrieves the previous retard pn-offset value 702 generated by DLL 500 and the previous advanced pn-offset value 710 generated by DLL 501. Using retrieved pn-offsets 702 and 710, controller 660 then overrides the erroneous advanced and retard pn-offset values being generated in DLL 500 and 501. Accordingly, DLLs 500 and 501 share the same advanced and retard pn-offset values 702 and 710, to track multipath rays 119 and 107 in a dependent way resulting in identical adjusted on-time pn-offset appearing at DLL outputs 550 and 551.

Retard and advanced pn-offset values 702 and 710 selected by controller 660 are used in DLL 500 and 501 operation until multipath signals 119 and 107 have shifted to an on-time offset value of more than ⅝ PN chip apart, as determined by finger manager 409. Upon noting that the on-time pn-offsets received at antenna 401 and output from finger manager 409 are greater than ⅝ PN chip value apart, controller 660 will remove the override condition from DLLs 500 and 501, thus allowing conventional tracking to resume.

Although retrieved pn-offsets 702 and 710 are being used for illustrative purposes, controller 660 retrieves the most recent advanced and retard pn-offset values corresponding to the shifted multipath rays.

The IS-95A reverse link channel has been specifically referred to herein, but the present invention is applicable to any digital channel, including but not limited to the forward link IS-95A channel and to all forward- and reverse-link TDMA channels, in all TDMA systems such as Groupe Special Mobile (GSM), a European TDMA system, Pacific Digital Cellular (PDC), a Japanese TDMA system, and Interim Standard 54 (IS-54), a U.S. TDMA system.

The principles of the present invention which apply to a cellular-based digital communication systems, including but not limited to personal communicating systems, trunked systems, satellite systems and data networks. Likewise, the principles of the present invention which apply to all types of digital radio frequency channels also apply to other types of communication channels, such as radio frequency signaling channels, electronic data buses, wireline channels, optical fiber links and satellite links.

It will furthermore be apparent that other forms of the invention, and embodiments other than the specific embodiments described above, may be devised without departing from the spirit and scope of the appended claims and their equivalents, and therefore it is intended that the scope of this invention will only be governed by the following claims and their equivalents.

What we claim is:

1. In a code division multiple access wireless communication system, the system including an antenna and a base site receiver for demodulating a plurality of multipath rays representing a mobile communication signal, the base site receiver including at least two receiver tracking fingers, a method for tracking the mobile communication signal comprising:

receiving at the antenna a first multipath signal arriving at a first pn-offset;

receiving at the antenna a second multipath signal arriving at a second pn-offset;

despreading the first multipath signal utilizing a third pn-offset value that is advanced in time from the first pn-offset; and despreading the second multipath signal utilizing a fourth pn-offset value that is retarded in time from the second pn-offset.

2. The method according to claim 1, wherein the pn-offsets are measured in PN chips.

3. The method according to claim 2, wherein the third pn-offset value is ½ PN chip above the first pn-offset.

4. The method according to claim 3, wherein the fourth pn-offset value is ½ chip below the second pn-offset.

5. The method according to claim 1, wherein the step of despreading the first multipath signal further comprises the steps of:

receiving at a controller, a plurality of finger manager outputs comprising at least the the first pn-offset associated with the first multipath signal and the second pn-offset associated with the second multipath signal; and establishing a time difference between the first and the second pn-offset forming an established time difference; and despreading the first multipath signal utilizing a third pn-offset value that is advanced in time from the first pn-offset, wherein the advancement in time is based on the established time difference.

6. In a code division multipole access wireless communication system, the system including an antenna and a base site receiver for demodulating a plurality of multipath rays representing a mobile communication signal, the base site receiver including at least two receiver fingers, a method for tracking the communication signal comprising:

receiving at the antenna a first multipath signal arriving at a first pn-offset;

receiving at the antenna a second multipath signal arriving at a second pn-offset;

calculating by first delay lock loop associated with one of the at least two receiver fingers, a first advanced pn-offset value and a first retard pn-offset value associated with the first pn-offset;

calculating by a second delay lock loop associated with the other of the at least two receiver fingers, a second advanced pn-offset value and a second retard pn-offset value associated with the second pn-offset;

storing the first and second advanced pn-offset values and the first and second retard pn-offset values;

receiving and storing at the controller, a plurality of finger manager outputs, the plurality comprising at least the first pn-offset associated with the first multipath signal and the second pn-offset associated with the second multipath signal;

establishing, a time difference between the first pn-offset associated with the first multipath signal and the second pn-offset associated with the second multipath signal;

comparing the time difference to a predetermined time difference threshold;

retrieving a previous retard pn-offset value associated with the first multipath signal and a previous advanced pn-offset value associated with the second multipath signal if the time difference is less than the predetermined time difference threshold;

substituting the previous retard pn-offset value and the previous advanced pn-offset values in an operation of the first and second delay lock loop, forming a new adjusted on-time pn-offset location; and tracking the mobile communication signal at the new adjusted on-time pn-offset location.

7. The method according to claim 6, wherein the pn-offsets are measured in PN chips.

8. In a code division multiple access wireless communication system, the system including a base site receiver for demodulating a plurality of multipath signals representing a mobile communication signal, the base site receiver including at least two receiver fingers, an apparatus for tracking the mobile communication signal comprising:

an antenna for receiving a first and second multipath signal associated with the mobile communication signal;

a searcher for determining a first pn-offset value of the first multipath signal and second pn-offset value of the second multipath signal;

a finger manager for providing the first pn-offset value to one of the at least two receiver fingers, and the second pn-offset value to a the other of the at least two receiver fingers;

a first delay lock loop associated with one of the at least two receiver fingers for calculating a third pn-offset value and a fourth pn-offset value associated with the first pn-offset value of the first multipath signal, and outputting an adjusted first pn-offset to a despreader; and a second delay lock loop associated with the other of the at least two receiver fingers, for calculating a fourth pn-offset value and a fifth pn-offset value associated with the second pn-offset value, and outputting an adjusted second pn-offset to a despreader.

* * * * *